United States Patent [19]

MacLean et al.

[11] 3,725,487

[45] Apr. 3, 1973

[54] PREPARATION OF DIHALOALKANES AND RELATED PRODUCTS

[75] Inventors: Alexander F. MacLean; Charles C. Hobbs, Jr.; Edward F. Dougherty, all of Corpus Christi, Tex.

[73] Assignee: Celanese Corporation of America, New York, N.Y.

[22] Filed: Apr. 13, 1970

[21] Appl. No.: 31,880

Related U.S. Application Data

[63] Continuation of Ser. No. 473,807, July 21, 1965, abandoned.

[52] U.S. Cl..........260/659 R, 260/465.3, 260/465.8, 260/465, 260/654 R
[51] Int. Cl................................................C07c 17/00
[58] Field of Search...................................260/659 R

[56] References Cited

UNITED STATES PATENTS

| | | |
|---|---|---|
| 3,285,981 | 11/1966 | MacLean et al..................260/659 R |
| 3,214,481 | 10/1965 | Heinemann et al...............260/659 R |

*Primary Examiner*—Leon Zitver
*Assistant Examiner*—Joseph A. Boska
*Attorney*—Marvin Turken, Kenneth A. Genoni, Stewart N. Rice and Ralph M. Pritchett

[57] ABSTRACT

Process for the preparation of an alpha-, omega-disubstituted alkane by reacting a vinyl compound such as ethylene with a chlorine, bromine, or cyanide ion in the presence of an inorganic symmetrical per oxygen compound and a metallic ion of $Ni^{+2}$, $Co^{+2}$, $Mn^{+2}$, $Tb^{+3}$, $Nd^{+3}$, $Pr^{+3}$, $Fe^{+2}$, $Cu^{+2}$, or $Tl^{+1}$.

5 Claims, No Drawings

PREPARATION OF DIHALOALKANES AND RELATED PRODUCTS

This application is a continuation of Ser. No. 473,807, filed July 21, 1965 and now abandoned.

This invention relates broadly to a method of producing substituted alkanes, particularly, alpha-, omega- disubstituted alkanes. More particularly the invention is concerned with the preparation of alpha-, omega-, dichloro-, dibromo-, or dicyanoalkanes by contacting together a vinyl compound in a medium containing an ion selected from the group consisting of chlorine, bromine, and cyanide ions, in the presence of an inorganic symmetrical per compound, e.g., inorganic persulfate, perphosphate, percarbonate, etc., and a metallic ion selected from the group consisting of $Ni^{+2}$, $Co^{+2}$, $Mn^{+2}$, $Tb^{+3}$, $Nd^{+3}$, $Pr^{+3}$, $Fe^{+2}$, $Cu^{+2}$, and $Tl^{+}$.

The free radical reaction of vinyl compounds such as ethylene with halogen ions in the presence of an inorganic symmetrical per compound such as inorganic persulfate, perphosphate, percarbonate, etc. has been described in an earlier application by MacLean et al, Ser. No. 316,151, filed Oct. 14, 1963, now U.S. Pat. No. 3,285,981, and assigned to the assignee of the present case. More particularly, there is described therein a method of producing an alpha-, omega-dichloroalkane including 1,4-dichlorobutane by reacting ethylene and sodium chloride together in the presence of potassium persulfate in an aqueous medium under an ethylene atmosphere at superatmospheric pressure.

The present invention is based on the discovery that alpha-, omega-disubstituted alkanes of the kind broadly described above can be obtained in significantly better yields by addition of the specific metallic ions mentioned above to the reaction medium.

Further, it was discovered that certain of the metallic ion catalysts favor high molecular weight $\alpha$, $\omega$-disubstituted alkanes. More specifically, it has been found that the presence of $Ni^{+2}$, $Co^{+2}$, $Ce^{+3}$ and the rare earths $Tb^{+3}$, $Nd^{+3}$, and $Pr^{+3}$ favor the production of higher molecular weight alpha-, omega-disubstituted alkanes such as the 1,4- and 1,6-disubstituted alkanes, while $Fe^{+2}$, $Tl^{+}$ and $Cu^{+2}$ favor the production of the lower molecular weight compounds, particularly the 1,2-disubstituted alkanes.

In practicing the invention any source of chlorine, bromine, and cyanide ions may be employed. Preferably the source is a water soluble material and is represented by the general formula

$$M^{y}X_{y}$$

where M is a metal of Group I, Group II or Group III of the Periodic Table, X is chlorine, bromine, or cyanide and y is an integer ranging from 1 to 3. Advantageously M represents metals such as the alkali metal and alkaline earth metals. More particularly, metals such as sodium, potassium, lithium, cerium, rubidium, calcium, barium, magnesium, aluminum, antimony and cerium are applicable.

The per compound reactants preferably are water-soluble persulfates including the water-soluble inorganic persulfates, perphosphates and percarbonates, e.g., the alkali-metal persulfates, perphosphates and percarbonates such, for instance, as sodium, potassium and lithium persulfates, perphosphates and percarbonates. Also, ammonium persulfate, perphosphate and percarbonate may be used. Illustrative examples of other persulfates that may be employed in this reaction are soluble persulfates such as the persulfates of calcium, strontium, barium and magnesium. Generally speaking, it is usually desirable to select the persulfate from among those that will not complicate the reaction.

Vinyl compounds useful in this invention include those which are not hydrolyzed to any appreciable extent under the required reaction conditions. Illustrative of the compounds useful in the invention are ethylene, propylene, vinyl chloride, acrylonitrile, butadiene, and styrene.

Any source of metallic ions of nickel, cobalt, manganese, cerium, terbium, neodymium, praseodymium, iron, copper and thallium may be employed. Preferably the source is a water-soluble material. Illustrative of materials which may be used include the chloride, bromide, cyanide, sulfate, and carbonate salts of the above metals.

It is not fully understood why these catalysts promote this free radical reaction. While not intending to be bound by any theory, it is believed that the catalysts might act in several ways. They could be oxidized more effectively than $Cl^{-}$ by $S_2O_8$ and in turn oxidize $Cl^{-}$, or form a higher oxidation state which then initiates polymerization, or further, they could terminate polymerization by transfer of a chlorine, bromine or cyanide group.

The reaction is preferably carried out in the liquid phase, more particularly in an aqueous reaction medium although an organic reaction medium may be used. For example, water alone, or water plus another additive, e.g., an acid or an alcohol such as acetic acid, methanol, ethanol, t-butyl alcohol, or further the acid or alcohol alone may be used.

The aqueous medium containing the reaction ingredients is usually maintained under an atmosphere of vinyl compound where the vinyl compound is gaseous at superatmospheric pressure during the reaction period, and, more particularly under a ethylene partial pressure of from about 50 p.s.i. to about 10,000 p.s.i. In any case, the reaction is suitably carried out at about 100 to 200 p.s.i.g. total pressure. Where the vinyl compound is liquid under the required reaction conditions, a two phase system is formed with the vinyl compound dissolving in the aqueous medium to the extent of its solubility at the particular pressure employed. Similar pressure conditions applicable to ethylene are also applicable with the other compounds.

The temperature of the reaction may vary, for example, between ambient temperature (about 20° – 30°C.), preferably at least about 40°C, and about 150°C.

The reaction may be carried out by continuous, semi-continuous or batch operation. Depending upon the particular reactants employed, the temperature of reaction and other influencing factors, the time of reaction may vary, for example, from 10 minutes, preferably from 1 hour, to 72 hours or more.

The molar proportions of the substitution ion, e.g. chloride, bromide, or cyanide, and the per compound may be varied considerably. Usually, however, the source of the substitution ion, e.g., an alkali-metal chloride such as NaCl, constitutes from about 1 to 10 moles thereof per mole of per compound. The mole ratio of vinyl compound to per compound in solution is dependent upon the solubility of the vinyl compound in the solution. With respect to ethylene, the ratio of ethylene to persulfate consumed is quite low. (It may even be less than 1.) However, as the dissolved ethylene is consumed in the reaction, additional ethylene from the atmosphere over the aqueous solution dissolves thereby maintaining a supply of this reactant in the solution without having a large amount dissolved at any one time.

The molar proportions of the metallic ion catalyst may also be varied considerably. Usually the metallic compound added as the source of metallic ions is present in the reaction medium in amounts of less than 0.5 mole of per compound and generally less than 0.1 mole per mole of per compound.

When the reaction is carried out in an aqueous reaction medium as is the preferred technique, the alpha-, omega-disubstituted alkanes that are formed separate as a distinct liquid phase since they are insoluble in and heavier than the aqueous phase. If desired, an amount of a stable ether compound such as dibutyl ether or saturated alkyl hydrocarbon sufficient to extract the alpha, omega-disubstituted alkanes as they are formed may be added to the reaction medium. The saturated alkyl hydrocarbon may be one having from 5 to 16 carbon atoms such as n-pentane, hexane, dodecane, etc.

The compounds resulting from the method of this invention are particularly useful in chemical synthesis because they permit simultaneous reactions at both ends of the carbon chain. By using various chemical techniques, there can be produced a series of glycols, diacids, diamines, etc., which are useful per se and also as reactants in other chemical reactions.

In order that those skilled in the art may better understand how the present invention can be carried into effect, the following examples are given by way of illustration and not by way of limitation.

The general procedure was as follows:

An aqueous phase 0.1 M in potassium persulfate, 0.40 M in sodium chloride and 0.010 M in the desired metallic ion catalyst was charged into a cylindrical glass vessel along with a desired amount of pentane. The vessel was placed in a high-pressure rocker bomb. The air in the system was displaced with ethylene under pressure. The mixture was heated at 85°C. under 150 psig. ethylene for at least 3 hours. The products were extracted in the pentane phase as they formed.

TABLE I

| Example Number | 1 | 2 | 3 | 4 | 5 | 6 | 7 | 8 | 9 | 10 | 11 |
|---|---|---|---|---|---|---|---|---|---|---|---|
| $K_2S_2O_8$ | 0.1 M | 0.10 M | 0.10 M | 0.10 M | 0.10 M | 0.10 M | 0.10 M | 0.10 M | 0.10 M | 0.10 M | 0.10 M |
| NaCl | 0.40 M | 0.40 M | 0.40 M | 0.40 M | 0.40 M | 0.40 M | 0.40 M | 0.40 M | 0.40 M | 0.40 M | 0.40 M |
| Catalyst: | | | | | | | | | | | |
| Ion | Blank | $Ni^{2+}$ | $Co^{2+}$ | $Ce^{3+}$ | $Mn^{2+}$ | $Tb^{3+}$ | $Nd^{3+}$ | $Pr^{3+}$ | $Fe^{2+}$ | $Cu^{2+}$ | $Tl^+$ |
| Moles/l | | 0.010 | 0.010 | 0.010 | 0.010 | 0.010 | 0.010 | 0.010 | 0.010 | 0.010 | 0.010 |
| Initial pH | 5.0 | 5.0 | 1.0 | 1.0 | 3.0 | 4.0 | 4.0 | 4.0 | 1.0 | 1.0 | 2.0 |
| Final pH | 1.5 | 1.62 | 1.6 | 0.9 | 1.3 | 1.5 | 1.5 | 1.4 | 0.9 | 1.4 | 1.9 |
| Percent conversion $K_2S_2O_8$ to— | | | | | | | | | | | |
| $Cl(CH_2)_2Cl$ | 5.4 | 5.5 | 3.8 | 8.5 | 3.6 | 4.2 | 4.8 | 4.6 | 56.2 | 54.6 | 20.4 |
| $Cl(CH_2)_4Cl$ | 5.2 | 17.6 | 9.4 | 13.6 | 11.4 | 10.3 | 8.5 | 14.4 | 2.9 | 0.5 | 27.7 |
| $Cl(CH_2)_6Cl$ | 1.6 | 5.7 | 4.4 | 5.6 | 3.0 | 3.9 | 4.0 | 2.0 | | | 7.4 |
| $Cl(CH_2)_8Cl$ | 1.0 | 2.5 | 1.8 | 2.4 | 0.3 | 1.3 | 2.0 | 0.6 | | | |
| $Cl(CH_2)_8+Cl$ | 0.5 | 0.8 | 0.9 | 0.8 | | 0.2 | 0.8 | | | | |
| Total conversion | 13.7 | 32.3 | 20.3 | 31.2 | 18.3 | 19.9 | 20.5 | 21.6 | 59.1 | 55.1 | 55.5 |

From the examples in Table I it can readily be seen that the ratio of the 1,4-, 1,6- and 1,8-dichloroalkanes to that 1,2-dichloroalkane is significantly greater in the case of $Ni^{+2}$, $Co^{+2}$, $Ce^{+3}$, $Mn^{+2}$, $Tb^{+3}$, $Nd^{+3}$, and $Pr^{+3}$ than $Fe^{+2}$, $Cu^{+2}$, and $Tl^{+1}$ when these are present in the reaction medium.

It will be understood, of course, by those skilled in the art that the present invention is not limited to the specific ingredients, proportions thereof, time and temperature of reaction and other operating conditions given in the forgoing detailed description and examples by way of illustration.

We claim:

1. The process for the preparation of 1,4-dichlorobutane and 1,6-dichlorohexane which comprises reacting ethylene in an aqueous medium with sodium chloride in the presence of potassium persulfate and the metallic ion catalyst, $Pr^{+3}$, under an ethylene atmosphere at superatmospheric pressure, the source of said metallic ion being a chloride, bromide, cyanide, sulfate or carbonate salt of the metal.

2. The process according to claim 1 wherein the process is carried out continuously.

3. The process according to claim 1 wherein the reaction is carried out at a temperature ranging between ambient temperature and 150°C. and a pressure ranging from 50 to 10,000 psi.

4. The process according to claim 1 wherein the time of reaction may vary from 10 minutes to 72 hours.

5. The process according to claim 1 wherein the substitution ion and the per compound are present in a molar ratio of about 1 to 10:1 and the metallic ion catalyst is present in an amount less than 0.5 mole per mole of per compound.

* * * * *